United States Patent
Charbonneau et al.

(10) Patent No.: US 9,533,905 B2
(45) Date of Patent: Jan. 3, 2017

(54) SUBMERGED COMBUSTION MELTERS HAVING AN EXTENDED TREATMENT ZONE AND METHODS OF PRODUCING MOLTEN GLASS

(71) Applicant: JOHNS MANVILLE, Denver, CO (US)

(72) Inventors: Mark William Charbonneau, Lakewood, CO (US); Kevin Patrick McHugh, Littleton, CO (US); Aaron Morgan Huber, Castle Rock, CO (US)

(73) Assignee: Johns Manville, Denver, CO (US)

( * ) Notice: Subject to any disclaimer, the term of this patent is extended or adjusted under 35 U.S.C. 154(b) by 711 days.

(21) Appl. No.: 13/633,979

(22) Filed: Oct. 3, 2012

(65) Prior Publication Data

US 2014/0090423 A1    Apr. 3, 2014

(51) Int. Cl.
  *C03B 5/225* (2006.01)
  *C03B 5/04* (2006.01)
  (Continued)

(52) U.S. Cl.
  CPC ........... *C03B 5/225* (2013.01); *C03B 5/04* (2013.01); *C03B 5/193* (2013.01); *C03B 5/20* (2013.01);
  (Continued)

(58) Field of Classification Search
  CPC ............... C03B 5/2356; C03B 2211/22; C03B 2211/23; C03B 5/193; C03B 5/225
  See application file for complete search history.

(56) References Cited

U.S. PATENT DOCUMENTS

| 1,716,433 A | 6/1929 | McKelvey et al. |
| 1,989,103 A | 1/1935 | McKelvey et al. |

(Continued)

FOREIGN PATENT DOCUMENTS

| DE | 44 24 814 A1 | 1/1996 |
| DE | 100 29 983 C2 | 9/2003 |

(Continued)

OTHER PUBLICATIONS

JP 58-199728 A (Suzuki) Nov. 21, 1983 (English language translation). Translated Jul. 2015 by Phoenix Translations.*

(Continued)

*Primary Examiner* — Erin Snelting
(74) *Attorney, Agent, or Firm* — Robert D. Touslee

(57) ABSTRACT

A submerged combustion melter includes a floor, a roof, and a sidewall structure connecting the floor and roof defining an internal space. A first portion of the internal space defines a melting zone, and a second portion defines a fining zone immediately downstream of the melting zone. One or more combustion burners in either the floor, roof, the sidewall structure, or any combination of these, are configured to emit the combustion gases from a position under a level of, and positioned to transfer heat to and produce, a turbulent molten mass of glass containing bubbles in the melting zone. The fining zone is devoid of combustion burners or other apparatus or components that would increase turbulence above that in the melting zone. The melter may include a treating zone that stabilizes or destabilizes bubbles and/or foam. Processes of using the melters are a feature of the disclosure.

14 Claims, 8 Drawing Sheets

(51) Int. Cl.
*C03B 5/193* (2006.01)
*C03B 5/20* (2006.01)
*C03B 5/235* (2006.01)

(52) U.S. Cl.
CPC ............ *C03B 5/205* (2013.01); *C03B 5/2356* (2013.01); *C03B 2211/22* (2013.01); *C03B 2211/23* (2013.01); *C03B 2211/24* (2013.01); *Y02P 40/55* (2015.11)

(56) References Cited

U.S. PATENT DOCUMENTS

| | | |
|---|---|---|
| 2,174,533 A | 10/1939 | See et al. |
| 2,118,479 A | 1/1940 | McCaskey |
| 2,269,459 A | 1/1942 | Kleist |
| 2,432,942 A | 12/1947 | See et al. |
| 2,455,907 A | 1/1948 | Slayter |
| 2,679,749 A | 6/1954 | Poole |
| 2,718,096 A | 9/1955 | Henry et al. |
| 2,773,545 A | 12/1956 | Petersen |
| 2,781,756 A | 2/1957 | Kobe |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,237,929 A | 3/1966 | Plumat et al. |
| 3,241,548 A | 3/1966 | See et al. |
| 3,245,769 A | 4/1966 | Eck et at |
| 3,248,205 A | 4/1966 | Dolf et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,421,873 A | 1/1969 | Burgman et al. |
| 3,432,399 A | 3/1969 | Schutt |
| 3,445,214 A | 5/1969 | Oremesher |
| 3,498,779 A | 3/1970 | Hathaway |
| 3,510,393 A | 5/1970 | Burgman et al. |
| 3,519,412 A | 7/1970 | Olink |
| 3,525,674 A | 8/1970 | Barnebey |
| 3,533,770 A | 10/1970 | Adler et al. |
| 3,563,683 A | 2/1971 | Hess |
| 3,592,151 A | 7/1971 | Webber |
| 3,592,623 A | 7/1971 | Shepherd |
| 3,606,825 A | 9/1971 | Johnson |
| 3,617,234 A | 11/1971 | Hawkins et al. |
| 3,627,504 A | 12/1971 | Johnson et al. |
| 3,692,017 A | 9/1972 | Glachant et al. |
| 3,717,139 A | 2/1973 | Guillet et al. |
| 3,738,792 A | 6/1973 | Feng |
| 3,746,527 A | 7/1973 | Knavish et al. |
| 3,747,588 A | 7/1973 | Booth |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,083,711 A | 4/1978 | Jensen |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,226,564 A | 10/1980 | Takahashi et al. |
| 4,238,226 A | 12/1980 | Sanzenbacher et al. |
| 4,249,927 A | 2/1981 | Fakuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,323,718 A | 4/1982 | Buhring et al. |
| 4,349,376 A | 9/1982 | Dunn et al. |
| 4,360,373 A | 11/1982 | Pecoraro |
| 4,397,692 A | 8/1983 | Ramge et al. |
| 4,406,683 A | 9/1983 | Demarest |
| 4,413,882 A | 11/1983 | Bailey et al. |
| 4,424,071 A | 1/1984 | Steitz et al. |
| 4,432,780 A | 2/1984 | Propster et al. |
| 4,488,537 A | 12/1984 | Laurent |
| 4,539,034 A | 9/1985 | Hanneken |
| 4,542,106 A | 9/1985 | Sproull |
| 4,545,800 A | 10/1985 | Won et al. |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,723,708 A | 2/1988 | Berger et al. |
| 4,735,642 A | 4/1988 | Jensen et al. |
| 4,738,938 A | 4/1988 | Kunkle et al. |
| 4,758,259 A | 7/1988 | Jensen |
| 4,798,616 A | 1/1989 | Knavish et al. |
| 4,814,387 A | 3/1989 | Donat |
| 4,816,056 A | 3/1989 | Tsai et al. |
| 4,877,436 A | 10/1989 | Sheinkop |
| 4,882,736 A | 11/1989 | Pieper |
| 4,886,539 A | 12/1989 | Gerutti et al. |
| 4,919,700 A | 4/1990 | Pecoraro et al. |
| 4,927,886 A | 5/1990 | Backderf et al. |
| 4,953,376 A | 9/1990 | Merlone |
| 5,011,086 A | 4/1991 | Sonnleitner |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,449,286 A | 9/1995 | Snyder et al. |
| 5,473,885 A | 12/1995 | Hunter, Jr. et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |

(56) References Cited

U.S. PATENT DOCUMENTS

| | | |
|---|---|---|
| 5,736,476 A | 4/1998 | Warzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,887,978 A | 3/1999 | Lunghofer et al. |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,045,353 A | 4/2000 | VonDrasek et al. |
| 6,068,468 A | 5/2000 | Phillipe et al. |
| 6,071,116 A | 6/2000 | Phillipe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,178,777 B1 | 1/2001 | Chenoweth |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillipe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,332,339 B1 | 12/2001 | Kawaguchi et al. |
| 6,338,337 B1 | 1/2002 | Panz et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,238 B2 | 3/2003 | Kawaguchi et al. |
| 6,536,651 B2 | 3/2003 | Ezumi et al. |
| 6,558,606 B1 | 5/2003 | Kulkarni et al. |
| 6,578,779 B2 | 6/2003 | Dion |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,475,569 B2 * | 1/2009 | Baker et al. .................... 65/335 |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 8,033,254 B2 | 10/2011 | Hannum et al. |
| 8,279,899 B2 | 10/2012 | Kitabayashi |
| 8,285,411 B2 | 10/2012 | Hull et al. |
| 2002/0086077 A1 | 7/2002 | Noller et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0103323 A1 | 5/2005 | Engdal |
| 2005/0236747 A1 | 10/2005 | Rue et al. |
| 2006/0000239 A1 | 1/2006 | Jeanvoine et al. |
| 2006/0174655 A1 | 8/2006 | Kobayashi et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0212546 A1 | 9/2007 | Jeanvoine et al. |
| 2007/0220922 A1 | 9/2007 | Bauer et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0293857 A1 | 11/2008 | Crawford et al. |
| 2009/0042709 A1 | 2/2009 | Jeanvoine et al. |
| 2009/0220899 A1 | 9/2009 | Spangelo et al. |
| 2009/0320525 A1 * | 12/2009 | Johnson ..................... 65/134.5 |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0143601 A1 | 6/2010 | Hawtof et al. |
| 2010/0227971 A1 | 9/2010 | Crawford et al. |
| 2010/0236323 A1 | 9/2010 | D'Angelico et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0326137 A1 | 12/2010 | Rouchy et al. |

(56) References Cited

U.S. PATENT DOCUMENTS

| | | | |
|---|---|---|---|
| 2011/0054091 | A1 | 3/2011 | Crawford et al. |
| 2011/0061642 | A1 | 3/2011 | Rouchy et al. |
| 2011/0088432 | A1 | 4/2011 | Pumode et al. |
| 2011/0107670 | A1 | 5/2011 | Galley et al. |
| 2011/0236846 | A1 | 9/2011 | Rue et al. |
| 2011/0308280 | A1 | 12/2011 | Huber |
| 2012/0077135 | A1 | 3/2012 | Charbonneau |
| 2013/0086944 | A1 | 4/2013 | Shock et al. |
| 2013/0086949 | A1 | 4/2013 | Charbonneau |
| 2013/0086950 | A1 | 4/2013 | Huber et al. |
| 2013/0086951 | A1 | 4/2013 | Charbonneau et al. |
| 2013/0086952 | A1 | 4/2013 | Charbonneau et al. |

FOREIGN PATENT DOCUMENTS

| | | |
|---|---|---|
| DE | 10 2005 033330 B3 | 8/2006 |
| EP | 0 181 248 B1 | 10/1989 |
| EP | 1 337 789 B1 | 12/2004 |
| EP | 2 133 315 A1 | 12/2009 |
| EP | 1 986 966 B1 | 4/2010 |
| EP | 1 667 934 B1 | 2/2011 |
| EP | 2 397 446 A2 | 12/2011 |
| EP | 2 433 911 A1 | 3/2012 |
| EP | 2 578 548 A2 | 4/2013 |
| FR | 2 740 860 A1 | 9/1997 |
| GB | 191301772 | 0/1914 |
| GB | 191407633 | 0/1914 |
| GB | 164073 A | 5/1921 |
| GB | 1449439 | 9/1976 |
| IT | 1208172 | 7/1989 |
| JP | 58199728 A * | 11/1983 |
| KR | 2000 0050572 A | 5/2000 |
| RO | 114827 | 7/1999 |
| WO | 9855411 A1 | 12/1998 |
| WO | 2010011701 A2 | 1/2007 |
| WO | 2008103291 A1 | 8/2008 |
| WO | 2009091558 A1 | 7/2009 |
| WO | 2010045196 A3 | 4/2010 |

OTHER PUBLICATIONS

"Glass Technologies—The Legacy of a Successful Public-Private Partnership", 2007, U.S. Department of Energy, pp. 1-32.

Rue, "Energy-Efficient Glass Melting—The Next Generation Melter", Gas Technology Institute, Project No. 20621 Final Report, 2008.

U.S. Appl. No. 12/817,754, filed Jun. 17, 2010, Huber.
U.S. Appl. No. 12/888,970, filed Sep. 23, 2010, Charbonneau.
U.S. Appl. No. 13/267,990, filed Oct. 7, 2010, Shock et al.
U.S. Appl. No. 13/268,028, filed Oct. 7, 2010, Charbonneau.
U.S. Appl. No. 13/268,065, filed Oct. 7, 2010, Charbonneau et al.
U.S. Appl. No. 13/268,098, filed Oct. 7, 2010, Huber et al.
U.S. Appl. No. 13/268,130, filed Oct. 7, 2010, Charbonneau et al.
U.S. Appl. No. 13/458,211, filed Apr. 27, 2012, Mobley et al.
U.S. Appl. No. 13/493,170, filed Jun. 11, 2012, Huber et al.
U.S. Appl. No. 13/493,219, filed Jun. 11, 2012, Charbonneau.

"Glass Industry of the Future", Sep. 30, 2008, United States Department of Energy, report 02-GA50113-03, pp. 1-17.

Stevenson, "Foam Engineering—Fundamentals and Applications", Published 2012, Chapter 16, John Wiley & Sons, Ltd.

Clare et al., "Density and Surface Tension of Borate Containing Silicate Glass Melts", Glass Technology, 2003, 44(2), pp. 59-62.

Seward, T.P., "Modeling of Glass Making Processes for Improved Efficiency", DE-FG07-96EE41262, Final Report, Mar. 31, 2003.

Conradt et al., Foaming behaviour on glass melts, Glastechniche Berichte 60 (1987) Nr. 6, S. 189-201 Abstract Fraunhofer ISC.

Kim et al., "Foaming in Glass Melts Produced by Sodium Sulfate Decomposition under Isothermal Conditions", Journal of the American Ceramic Society, 1991, 74(3), pp. 551-555.

Kim et al., "Foaming in Glass Melts Produced by Sodium Sulfate Decomposition under Ramp Heating Conditions", Journal of the American Ceramic Society, 1992, 75(11), pp. 2959-2963.

Kim et al., "Effect of Furnace Atmosphere on E-glass Foaming", Journal of Non-Crystalline Solids, 2006. 352(50/51), pp. 5287-5295.

Van Limpt, et al., "Modelling the evaporation of boron species, Alkali-free borosilicate glass melts", Glass Technology—European Journal of Glass Science and Technology. Part 1, Jun. 2011, 52(3), pp. 77-87.

U.S. Appl. No. 13/540,771, filed Jul. 3, 2012, Charbonneau et al.
U.S. Appl. No. 13/633,998, filed Oct. 3, 2012, Charbonneau et al.
U.S. Appl. No. 13/644,058, filed Oct. 3, 2012, Charbonneau et al.
U.S. Appl. No. 13/644,104, filed Oct. 3, 2012, Charbonneau et al.
U.S. Appl. No. 13/644,039, filed Oct. 3, 2012, Shock et al.

"AccuTru Temperature Measurement," AccuTru International Corporation, 2003.

"Glass Melting Technology—A Technical and Economic Assessment," 2004, U.S. Department of Energy, pp. 1-292.

"Canty Process Technology" brochure, date unknown, copy received in Apr. 2012 at American Institute of Chemical Engineers, Spring Meeting, Houston, TX.

Olabin, V.M. et al. "Submerged Combustion Furnace for Glass Melts," Ceramic Engineering and Science Proceedings, Jan. 1, 1996, pp. 84-92, vol. 17—No. 2, American Ceramic Society Inc., US.

Higley, BA, Glass Melter System Technologies for Vitrification of High-Sodium Content Low-Level, Radioactive Liquid Wastes—Phase I: SBS Demonstration With Simulated Low-Level Waste—Final Test Report, Westinghouse Hanford Company.

Report for Treating Hanford LAW and WTP SW Simulants: Pilot Planet Mineralizing Flowsheet Apr. 2009, Department of Energy Environmental Management Consolidated Business Center by THOR Treatment Technologies, LLC.

* cited by examiner

SUBMERGED COMBUSTION MELTERS HAVING AN EXTENDED TREATMENT ZONE AND METHODS OF PRODUCING MOLTEN GLASS

CROSS-REFERENCE TO RELATED APPLICATIONS

This application may be related to the following United States non-provisional patent applications assigned to the assignee of the present application which are all incorporated by reference herein: U.S. Ser. No. 12/817,754, filed Jun. 17, 2010 (now U.S. Pat. No. 8,769,992); U.S. Ser. No. 13/267,990 (now U.S. Pat. No. 8,997,525), 13/268,028 (now U.S. Pat. No. 8,875,544), Ser. No. 13/268,098 (now U.S. Pat. No. 8,707,740), and Ser. No. 13/268,130 (now U.S. Pat. No. 9,021,838), all four filed Oct. 7, 2011; U.S. Ser. No. 13/458,211, filed Apr. 27, 2012; U.S. Ser. No. 13/493,170 (now U.S. Pat. No. 8,707,739) and Ser. No. 13/493,219, both filed Jun. 11, 2012; U.S. Ser. No. 13/540,771, filed Jul. 3, 2012 (now U.S. Pat. No. 9,032,760): and U.S. Ser. Nos. 13/644,058, 13/644,104, 13/633,998 (now U.S. Pat. No. 8,973,405), and Ser. No. 13/644,039 (now U.S. Pat. No. 8,991,215), all four filed on Oct. 3, 2012.

BACKGROUND INFORMATION

Technical Field

The present disclosure relates generally to the field of combustion furnaces and methods of use to produce glass, and more specifically to submerged combustion melters and methods for producing foamed glass, hollow or entrained-gas fiber, or non-foamed glass using the submerged combustion melters.

Background Art

A submerged combustion melter (SCM) may be employed to melt glass batch materials to produce molten glass by passing oxygen, oxygen-enriched mixtures, or air along with a liquid, gaseous fuel, or particulate fuel in the glass batch, directly into a molten pool of glass usually through burners submerged in a glass melt pool. The introduction of high flow rates of oxidant and fuel into the molten glass, and the expansion of the gases cause rapid melting of the glass batch and much turbulence, and possibly foaming.

Often it is a primary goal to melt batch or other feed materials in an SCM as quickly and with as small a footprint SCM as possible. Although this is still desired for the most part, one drawback to this strategy in known SCMs is the lack of, or total absence of melter footprint or size outside of the submerged combustion melting zone that might provide some time downstream of the melting zone for treatment of the turbulent, foamy molten glass before it enters downstream equipment. Furthermore, there typically is a lack of, or no melter footprint before the melting zone of an SCM. These failings may severely limit the flexibility of operation of an SCM.

Fining or removal of foam prior to downstream processing may be desired in some instances, while in other instances increased or changed foaming may be desired, for example, when producing hollow fiber or producing products including entrained bubbles. Reduced foaming may be desired in the first case, as the foam may stabilize in a top layer when the molten mass is routed through conventional conditioning and/or distribution channels/systems downstream of the SCM. The foam layer may impede the ability to apply heat to the glass using combustion burners to achieve or maintain temperature and compositional homogeneity of the molten glass, and may also impede the rate at which further bubbles in the melt rise and thus affect expulsion of the bubbles and mass flow rate of the melt in the channels. In extreme cases, the foam generated may interfere with the traditional energy application methods employed, which may cause systems to require shutdown, maintenance and may result in a process upset. Attempts to reduce the foam through process adjustments have not met with complete success in reducing foam to an acceptable amount. On the other hand, in cases where foaming may be desired, control of bubble size, composition, and the like may be hindered in smaller footprint SCMs.

It would be an advance in the glass manufacturing art if submerged combustion melters and processes of their use could address the above restrictions on flexibility of operation.

SUMMARY

In accordance with the present disclosure, submerged combustion melters and processes are described which reduce or overcome one or more of the above problems.

A first aspect of the disclosure is a submerged combustion melter comprising:

a floor, a roof, and a sidewall structure connecting the floor and roof defining an internal space, a first portion of the internal space comprising a melting zone, and a second portion of the internal space defining a fining zone immediately downstream of the melting zone;

one or more combustion burners in either the floor, the roof, the sidewall structure, or any two or more of these, producing combustion gases and configured to emit the combustion gases from a position under a level of, and positioned to transfer heat to and produce, a turbulent molten mass of glass containing bubbles in the melting zone;

the submerged combustion melter comprising a geometry whereby the level of the molten glass is substantially equivalent in the melting zone and the fining zone, and the fining zone is devoid of combustion burners or other apparatus or components that would increase turbulence above that in the melting zone.

A second aspect of the disclosure is a submerged combustion melter comprising:

a floor, a roof, and a sidewall structure connecting the floor and roof defining an internal space, a first portion of the space comprising a melting zone, and a second portion of the space comprising a fining zone immediately downstream of the melting zone, a third portion of the space comprising a treating zone downstream of the melting zone and upstream of the fining zone, and a fourth portion of the space comprising a feed zone upstream of the melting zone, wherein the feed zone, the treating zone, and the fining zone are all devoid of submerged combustion burners other apparatus to increase turbulence above that in the melting zone;

one or more combustion burners in either the floor, the roof, the sidewall structure, or any two or more of these, producing combustion gases and configured to emit the combustion gases from a position under a level of, and positioned to transfer heat to and produce, a turbulent molten mass of glass containing bubbles in the melting zone;

one or more non-burner apparatus configured to inject a composition into the molten glass in the treating zone; and the submerged combustion melter comprising a geometry whereby the level of the molten glass is substantially equivalent in the feed zone, the melting zone, the treating zone, and the fining zone, and optionally comprising an exhaust stack positioned in the roof of the fining section.

A third aspect of the disclosure is a process comprising:

charging a feed composition into a submerged combustion melter comprising a geometry, at least a portion of the feed composition comprising a vitrifiable material;

heating the feed composition with one or more submerged combustion burners, thereby melting at least a portion of the vitrifiable material in a melting zone of the submerged combustion melter to form a turbulent molten mass of glass and bubbles in the melting zone;

allowing the turbulent molten mass of glass and bubbles to flow into a fining zone in the submerged combustion melter immediately downstream of the melting zone, the fining zone devoid of submerged combustion burners and other apparatus or components that would increase turbulence above that in the melting zone, thus forming a fined molten mass of glass; and maintaining a level of molten glass in the fining zone substantially equal to a level of the molten glass in the melting zone.

A fourth aspect of the disclosure is a process comprising:

charging a feed composition into a submerged combustion melter comprising a feed zone, at least a portion of the feed composition comprising a vitrifiable material;

heating the feed composition with one or more submerged combustion burners in a melting zone downstream of the feed zone, thereby melting at least a portion of the vitrifiable material in the melting zone of the submerged combustion melter to form a turbulent molten mass of glass and bubbles in the melting zone;

allowing the turbulent molten mass of glass and bubbles to flow from the melting zone into a treating zone in the submerged combustion melter immediately downstream of the melting zone, and feeding a treating composition into the molten glass in the treating zone, the treating zone devoid of submerged combustion burners and other apparatus or components that would increase turbulence above that in the melting zone, thus forming a treated molten mass of glass;

allowing the treated molten mass of glass to flow from the treating zone into a fining zone in the submerged combustion melter immediately downstream of the treating zone, the fining zone devoid of submerged combustion burners and other apparatus or components that would increase turbulence above that in the melting zone, thus forming a treated, fined molten mass of glass;

maintaining a level of molten glass in the feed zone, the treating zone, and the fining zone substantially equal to a level of the molten glass in the melting zone; and exhausting the submerged combustion melter employing an exhaust stack positioned in the roof of the fining section.

Submerged combustion melters and processes of this disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1:
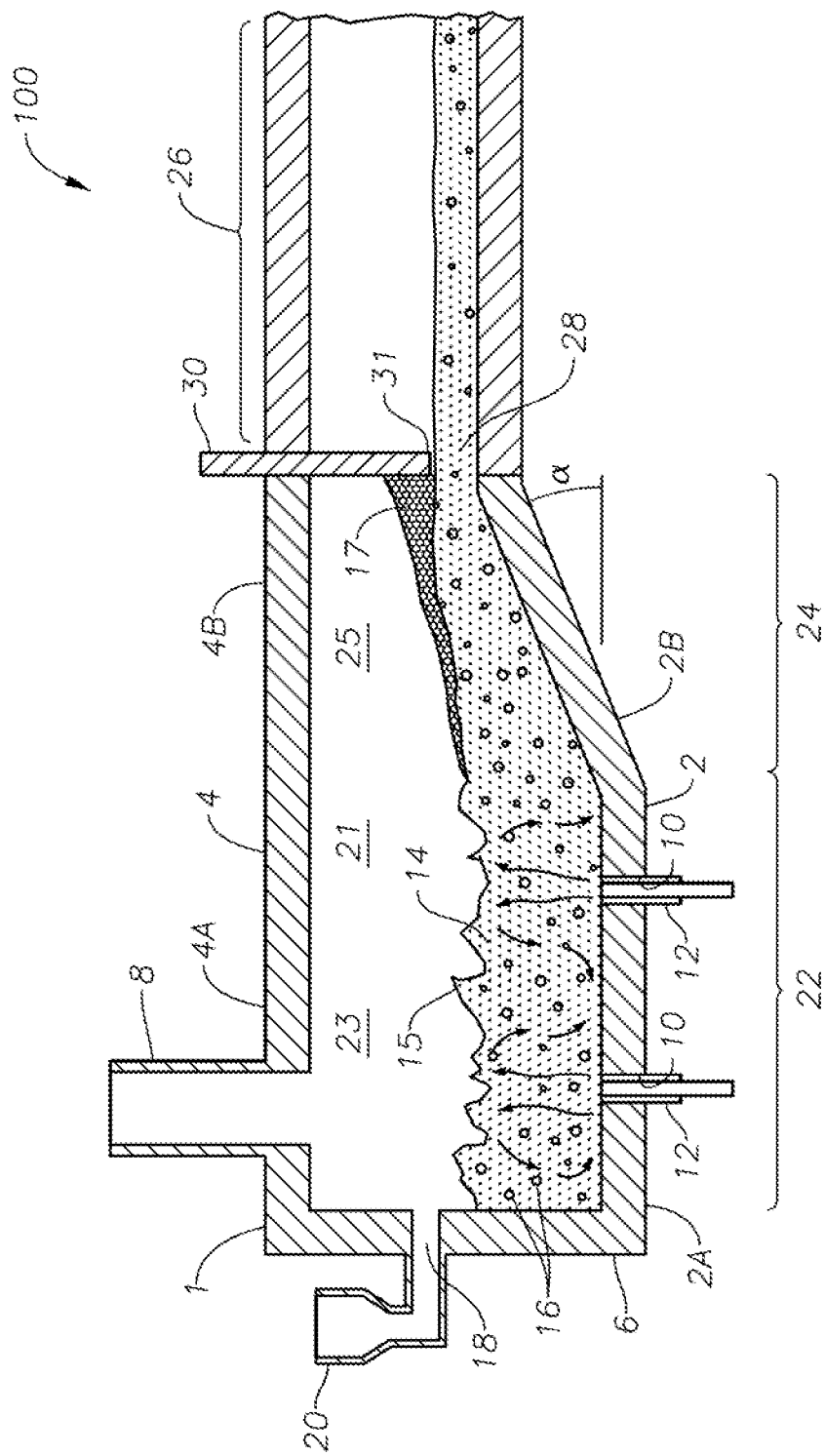
FIGS. 1-6 are schematic side elevation views, partially in cross-section with some portions cut away, of six system embodiments in accordance with this disclosure.

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed systems and methods. However, it will be understood by those skilled in the art that the systems and methods covered by the claims may be practiced without these details and that numerous variations or modifications from the specifically described embodiments may be possible and are deemed within the claims. All U.S. published patent applications and U.S. patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, one drawback to present submerged combustion melters is the lack of, or total absence of melter footprint or size outside of the submerged combustion melting zone that might provide some time downstream of the melting zone for treatment of the turbulent, foamy molten glass before it enters downstream equipment. Furthermore, there typically is a lack of, or no melter footprint before the melting zone of an SCM. These failings may severely limit the flexibility of operation of an SCM. Removal of foam prior to downstream processing may be desired in some instances, while in other instances increased or changed foaming may be desired, for example, when producing hollow fiber or producing products including entrained bubbles.

Applicants have discovered certain SCMs and processes that may reduce or eliminate such shortcomings.

Various terms are used throughout this disclosure. "Submerged" as used herein means that combustion gases emanate from combustion burners under the level of the molten glass; the burners may be floor-mounted, wall-mounted, or in melter embodiments comprising more than one submerged combustion burner, any combination thereof (for example, two floor mounted burners and one wall mounted burner). "SC" as used herein means "submerged combustion" unless otherwise specifically noted, and "SCM" means submerged combustion melter unless otherwise specifically noted.

The term "fining" as used herein means stabilizing or destabilizing foam, as well as the traditional concept of fining which refers to the removal of few bubbles from within the molten glass. A "fining zone" of an SCM may involve simply holding a molten mass of glass for a time at a certain temperature, or may include time at temperature plus action of a treatment composition introduced in a treatment zone of an SCM prior to a fining zone. The term "treating" means contacting a molten mass of glass with one or more compositions, or mixtures of compositions, in a "treating zone" of an SCM. Treating compositions may be organic, inorganic, of combinations or mixtures thereof, and may be gaseous (bubbles), liquid, solid, or combination or mixture thereof. The term "composition" includes one or more gases, one or more liquids or solids that may evolve a gas or become gaseous under the high temperature conditions associated with submerged combustion melting, one or more particulate solids, and combinations of thereof. The term "treating" means the treating composition is not simply present in the head space above the molten glass and foamy layer floating on top thereof, but is present in such a manner so that the composition has a greater chance of interacting with the "SC" bubbles of the foam and/or changing the SC bubble atmosphere and/or the SC bubble film.

The terms "foam" and "foamy" include froths, spume, suds, heads, fluffs, fizzes, lathers, effervesces, layer and the like. The term "bubble" means a thin, shaped, gas-filled film of molten glass. The shape may be spherical, hemispherical, rectangular, polyhedral, ovoid, and the like. The gas or "bubble atmosphere" in the gas-filled SC bubbles may comprise oxygen or other oxidants, nitrogen, combustion products (including but not limited to, carbon dioxide, carbon monoxide, $NO_x$, $SO_x$, $H_2S$, and water), reaction products of glass-forming ingredients (for example, but not limited to, sand (primarily $SiO_2$), clay, limestone (primarily $CaCO_3$), burnt dolomitic lime, borax and boric acid, and the like. Bubbles may include solids particles, for example soot particles, either in the film, the gas inside the film, or both.

As used herein the term "combustion gases" means substantially gaseous mixtures of combusted fuel, any excess oxidant, and combustion products, such as oxides of carbon (such as carbon monoxide, carbon dioxide), oxides of nitrogen, oxides of sulfur, and water. Combustion products may include liquids and solids, for example soot and unburned liquid fuels.

"Oxidant" as used herein includes air and gases having the same molar concentration of oxygen as air, oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

The term "flow channel" means a channel or conduit defined by a flow channel floor, a flow channel roof, and a flow channel wall structure connecting the floor and roof, and may have any operable cross-sectional shape (for example, but not limited to, rectangular, oval, circular, trapezoidal, hexagonal, and the like) and any flow path shape (for example, but not limited to, straight, zigzag, curved, and combinations thereof). In certain systems and processes the flow channel may be selected from the group consisting of a conditioning channel, a distribution channel, and a forehearth.

Conduits used in burners and devices for delivery of a treating composition useful in SCMs and processes of the present disclosure may be comprised of metal, ceramic, ceramic-lined metal, or combination thereof. Suitable metals include stainless steels, for example, but not limited to, 306 and 316 steel, as well as titanium alloys, aluminum alloys, and the like. Suitable materials for the glass-contact refractory, which may be present in SC melters and flow channels, and refractory burner blocks (if used), include fused zirconia ($ZrO_2$), fused cast AZS (alumina-zirconia-silica), rebonded AZS, or fused cast alumina ($Al_2O_3$). The melter, flow channel, treating composition delivery device, and burner geometry, and type of glass to be produced may dictate the choice of a particular material, among other parameters.

The terms "cooled" and "coolant" may include use of any heat transfer fluid and may be any gaseous, liquid, or some combination of gaseous and liquid composition that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from liquids that may be organic, inorganic, or some combination thereof, for example, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons.

Certain burners and treating composition delivery devices useful in SCMs and processes of this disclosure may be fluid-cooled, and may include first and second (or more) concentric conduits. In the case of burners, the first conduit may be fluidly connected at one end to a source of fuel, the second conduit may be fluidly connected to a source of oxidant, and a third substantially concentric conduit may connect to a source of cooling fluid. Treating composition delivery devices may be, for example, and not limited to those disclosed in assignee's co-pending application U.S. Ser. No. 13/540,771, filed Jul. 3, 2012 (now U.S. Pat. No. 9,032,760).

Certain SCMs of this disclosure may comprise one or more non-submerged burners. Suitable non-submerged combustion burners may comprise a fuel inlet conduit having an exit nozzle, the conduit and nozzle inserted into a cavity of a ceramic burner block, the ceramic burner block in turn inserted into either the SCM roof or the SCM wall structure, or both the SCM roof and SCM wall structure. Downstream flow channels may also comprise one or more non-submerged burners.

In certain systems, one or more burners in the SCM and/or the flow channel(s) may be adjustable with respect to direction of flow of the combustion products. Adjustment may be via automatic, semi-automatic, or manual control. Certain system embodiments may comprise a burner mount that mounts the burner in the wall structure, roof, or floor of the SCM and/or flow channel comprising a refractory, or refractory-lined ball joint. Other burner mounts may comprise rails mounted in slots in the wall or roof. In yet other embodiments the burners may be mounted outside of the melter or channel, on supports that allow adjustment of the combustion products flow direction. Useable supports include those comprising ball joints, cradles, rails, and the like.

Certain SCMs and/or flow channels may employ one or more high momentum burners, for example, to impinge on portions of a foam layer. High momentum burners useful in apparatus, systems, and methods of this disclosure include those disclosed assignee's patent application U.S. Ser. No. 13/268,130, filed Oct. 7, 2011 (now U.S. Pat. No. 9,021, 838). As used herein the phrase "high momentum" combustion burners means burners configured to have a fuel velocity ranging from about 150 ft./second to about 1000 ft./second (about 46 meters/second to about 305 meters/second) and an oxidant velocity ranging from about 150 ft./second to about 1000 ft./second (about 46 meters/second to about 305 meters/second). As used herein the phrase "low momentum" combustion burners means burners configured to have a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

Certain system and process embodiments of this disclosure may include submerged combustion melters comprising fluid-cooled panels such as disclosed in assignee's co-pending patent application U.S. Ser. No. 12/817,754, filed Jun. 17, 2010 (now U.S. Pat. No. 8,769,992). In certain system and process embodiments, the submerged combustion melter may include one or more adjustable flame submerged combustion burners comprising one or more oxy-fuel combustion burners, such as described in assignee's co-pending patent application U.S. Ser. No. 13/268,028, filed Oct. 7, 2011 ( now U.S. Pat. No. 8,875,544). In certain systems and processes, the submerged combustion melter may comprise a melter exit structure designed to minimize impact of mechanical energy, such as described is assignee's co-pending application U.S. Ser. No. 13/458,211, filed Apr. 27, 2012. In certain systems and processes, the flow channel may comprise a series of sections, and may comprise one or more skimmers and/or impingement (high momentum) burners, such as described in assignee's co-pending application U.S. Ser. No. 13/268130, filed Oct. 7, 2011 (now U.S. Pat. No. 9,021,838), and Ser. No. 13/493,170, filed Jun. 11, 2012 (now U.S. Pat. No. 8,707,739). Certain systems and processes of the present disclosure may utilize measurement and control schemes such as described in assignee's co-pending application U.S. Ser. No. 13/493,219, filed Jun. 11, 2012, and/or feed batch densification systems and methods as described in assignee's co-pending application U.S. Ser. No. 13/540,704, filed Jul. 3, 2012. Certain SCMs and processes of the present disclosure may utilize devices for delivery of treating compositions such as disclosed in assignee's co-pending application U.S. Ser. No. 13/633,998, filed Oct. 3, 2012 (now U.S. Pat. No. 8,973,405).

Certain SCMs and process embodiments of this disclosure may be controlled by one or more controllers. For example, burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain SCMs and processes of this disclosure may also measure and/or monitor feed rate of batch or other feed materials, such as glass batch, cullet, mat or wound roving and treatment compositions, mass of feed, and use these measurements for control purposes. Exemplary systems and methods of the disclosure may comprise a combustion controller which receives one or more input parameters selected from velocity of the fuel, velocity of oxidant, mass and/or volume flow rate of the fuel, mass and/or volume flow rate of oxidant, energy content of the fuel, temperature of the fuel as it enters the burner, temperature of the oxidant as it enters the burner, pressure of the oxidant entering the burner, humidity of the oxidant, burner geometry, oxidation ratio, temperature of the burner combustion products, temperature of melt, composition of bubbles and/or foam, and combinations thereof, and may employ a control algorithm to control combustion temperature, treatment composition flow rate or composition, based on one or more of these input parameters.

Specific non-limiting SCM and process embodiments in accordance with the present disclosure will now be presented in conjunction with FIGS. 1-8. The same numerals are used for the same or similar features in the various figures. In the views illustrated in FIGS. 1-6, it will be understood in each case that the figures are schematic in nature, and certain conventional features are not illustrated in order to illustrate more clearly the key features of each embodiment.

FIG. 1 is a schematic side elevation view, partially in cross-section with some portions cut away, of an SCM embodiment 100 in accordance with this disclosure. Illustrated schematically is a melter 1 fluidly and mechanically connected to a flow channel 26 downstream of melter 1. SCM 1 includes a floor 2, a roof or ceiling 4, a side wall structure 6, an exhaust stack 8, and one or more apertures 10 in floor 2 for corresponding one or more SC burners 12. It will be understood that one or more burners 12 may be mounted in sidewall structure 6. Roof-mounted burners (not illustrated) may also be included, for example for start-up. One or more burners 12 may be oxy/fuel burners. SC burners 12 produce a turbulent melt 14 having a turbulent surface 15, turbulent melt 14 comprising bubbles 16 having a bubble atmosphere. In general the atmosphere of the bubbles is about the same from bubble to bubble, but that is not necessarily so. One or more inlet ports 18 and batch feeders 20 maybe provided. Other feeds are possible, such as glass mat waste, wound roving, waste materials, and the like, such as disclosed in assignee's application U.S. Ser. No. 12/888,970, filed Sept. 23, 2010 (now U.S. Pat. No. 8,650,914).

Still referring to FIG. 1, floor 2, roof 4, and wall structure 6 define an internal space 21 comprising a first portion 23 and a second portion 25. First portion 23 of internal space 21, along with SC burners 12, a portion 2A of floor 2, and a portion 4A of roof 4 comprise a melting zone 22 of the SCM, while second portion 25 of internal space 21, along with a portion 2B of floor 2 and a portion 4B of ceiling 4 comprise a fining zone 24. SCM embodiment 100, with burners upstream of fining zone 24, and floor portion 2B angled upwards at an angle "α", assist in reducing or eliminating foam 17 and some of bubbles 16 prior to the molten mass of glass entering downstream flow channel 26. A skimmer 30 having a distal end 31 extending to a point just above the level of molten mass of glass may be provided, further assisting reduction or elimination of foam 17, producing a fined molten mass of glass 28 for further processing. Angle α may range from 0 to about 45 degrees. Larger angles may allow less volume of glass to be process (lower throughput), but a wider fining section may compensate for that. Smaller angles may conversely allow higher throughput, but less fining action.

Figure 2:
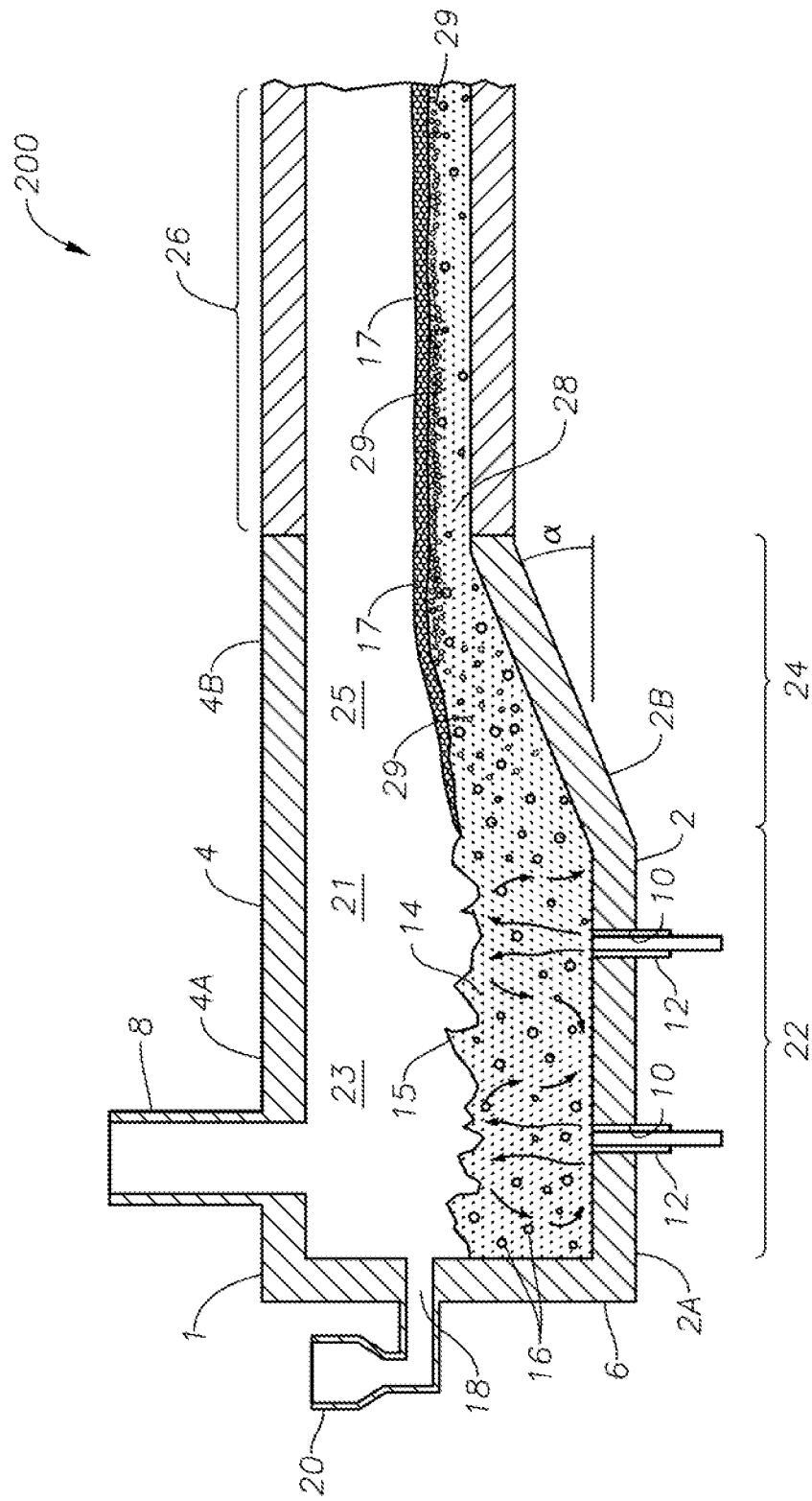

Referring now to FIG. 2, another SCM embodiment 200 is illustrated schematically. SCM embodiment 200 differs from embodiment 100 illustrated schematically in FIG. 1 by not having a skimmer. The geometry of SCM embodiment 200 may be useful for producing foamy molten glass 29, and thus foamed glass products, or products such as hollow fiber or fiber having regions devoid of glass. In embodiment 200, angle α may range from 0 to about 45 degrees. Larger angles may allow less volume of glass to be process (lower throughput), but a wider fining section may compensate for that. Smaller angles may conversely allow higher throughput of foamy glass in this embodiment.

SCM embodiments 100 and 200 of course could be combined in a single SCM by providing a retractable skimmer 30. This would require a prime mover (not illustrated) that could move skimmer 30 up and down as desired through an aperture between roof 4B and the roof of flow channel 26. Examples of useable prime movers include pneumatic, hydraulic, and electrical devices.

Figure 3:
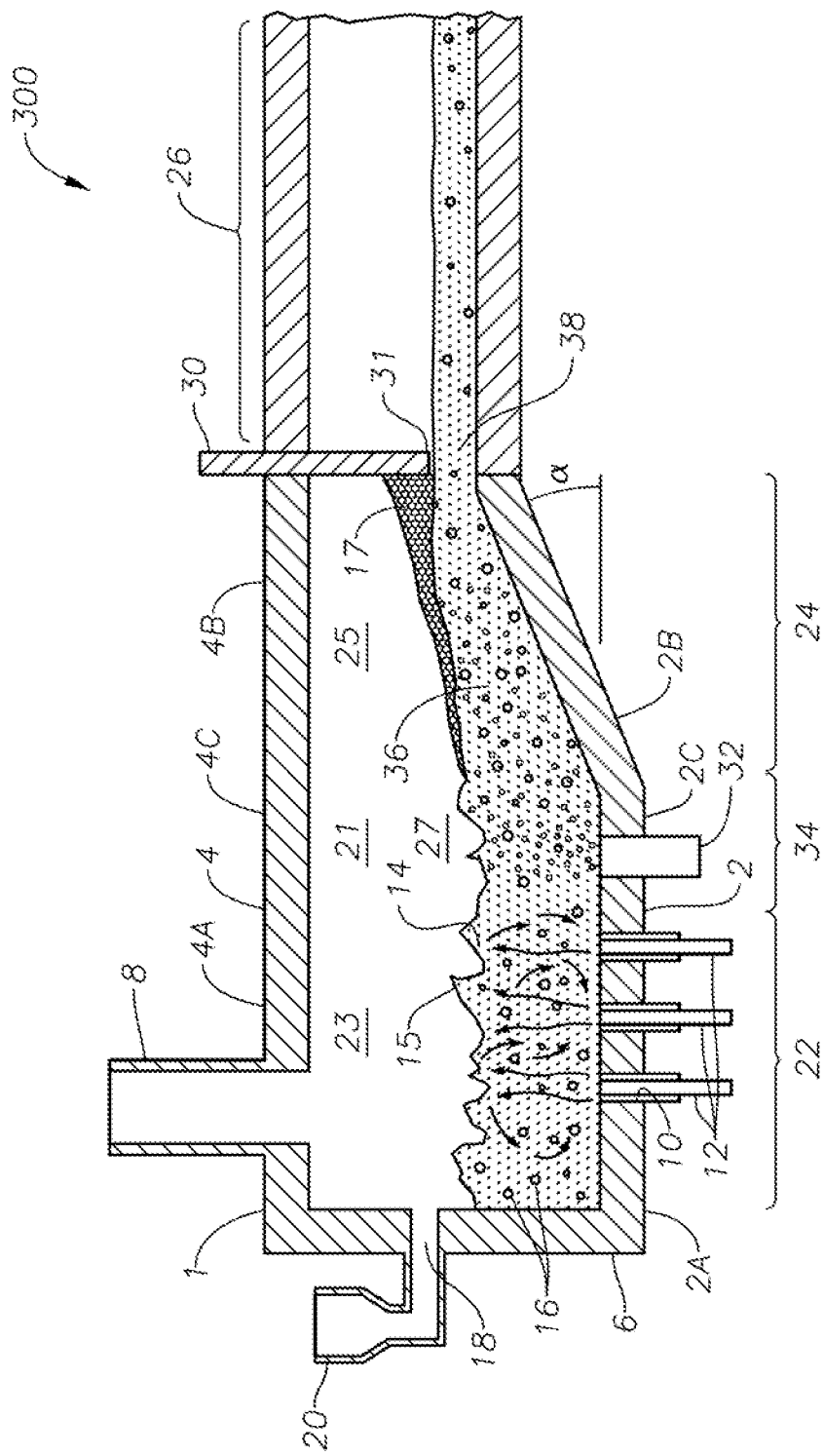

FIG. 3 illustrates schematically another SCM embodiment 300 in accordance with the present disclosure. Embodiment 300 differs from embodiment 100 by the inclusion of a third portion 27 of internal space 21 defined by floor portion 2C, roof portion 4C, and one or more treating composition delivery devices 32, to form a treatment zone 34 downstream of melting zone 22 and upstream of fining zone 24. Treatment composition delivery device 32 may be one or more bubblers, conduits, or other devices configured to direct one or more treating compositions into contact with the molten mass of glass 14. Turbulence in treatment zone 34 may be adjusted, for example by pressure of the treating composition, but is generally less than the turbulence in melting zone 22, and generally more than turbulence in fining zone 24. This contacting produces a treated molten mass of glass 36, which then is passed through fining zone 25 to produce a treated, fined molten mass of glass 38.

In processes of the present disclosure comprising feeding a treating composition into the molten mass of glass and bubbles in a treating zone 34 downstream of melting zone 22 and upstream of fining zone 24, the process may comprise decreasing stability of bubbles 16 using the treating composition, or increasing or substantially maintaining stability of bubbles 16 using the treating composition. In process embodiments where the treating composition decreases stability of bubbles 16, the treating composition may be organic, inorganic, reactive, inert, or partially reactive with gases and other materials in bubbles 16, and/or bubble glass films. In certain embodiments where the treating composition generally decreases stability of SC bubbles 16 (either alone or on combination with a downstream process such as high moisture or helium in flow channel 26, provided there is a driving force from a partial pressure standpoint to push water or helium into bubbles 16), the treating composition may be selected from the group consisting of hydrogen, nitrogen, helium, steam, argon and other noble gases, oxides of nitrogen, oxides of carbon, and oxides of sulfur (for example as described in assignee's co-pending application U.S. Ser. No. 13/644,039, filed Oct. 3. 2012 (now U.S. Pat. No. 8,991,215), and mixtures and combinations thereof. Organic compounds may be used as treatment compositions to decrease stability of bubbles 16, although they would likely not survive the temperatures used in molten glass processing. While not wanting to be held to any particular theory, we believe the addition of an organic compound at glass melting temperatures would decompose to provide carbon, oxygen and nitrogen and their associated gases, and thus they may be reasonable materials to add. Although the specific effects may be difficult to describe, it is reasonable to predict that their decomposition products would have the effect to de-stabilize bubbles, depending on partial pressures of those compounds in the bubbles compared with their partial pressure in the downstream flow channel atmosphere. Certain nano-materials, for example but not limited to nanosilicon particles, nanoclays, carbon nanotubes, carbon spherical morphologies such as buckminsterfullerene ($C_{60}$, $C_{70}$, and the like), and diamond may act to impart one or more high-stress locations in a bubble film, forming one or more inclusions, and therefore reduce bubble stability. These solids compounds could be bubbled into the molten mass of glass and bubbles 16 in the form of slurries or other flowable composition. In process embodiments where the treating composition increases or substantially maintains stability of bubbles 16, the treating composition may be organic, inorganic, reactive, inert, or partially reactive with gases and other materials in bubbles 16, and/or bubble glass films. In certain embodiments where the treating composition generally increases or substantially maintains stability of bubbles 16, the treating composition may be selected from the group consisting of dry air, nitrogen-enriched dry air, and dry mixtures of oxygen and nitrogen having concentrations similar to air, for example as described in assignee's co-pending application U.S. Ser. No. 13/644,039. filed Oct. 3, 2012 (now U.S. Pat. No. 8,991,215). Certain of the above-mentioned nano-materials (such as nanoclays), in specified quantities, may increase stability of foams. Finally, it has been found that certain treatment compositions may function to both increase and decrease stability of bubbles 16, depending on the quantity added. For example, sodium sulfate may act as both a stabilizing and a de-stabilizing agent depending on the quantity added. At low levels (about 1 wt. percent or lower, as a percentage of an aqueous treating composition) this compound may act as a surfactant and may improve stability of the bubbles. However at higher levels (about 5 wt. percent or above) the reduction in surface tension may overcome the stabilizing action of the surfactant and cause bubble collapse.

Treating compositions may increase or decrease bubble stability when used separately or in conjunction with one or more downstream processes. For example, adding nitrogen as a treating composition to the molten mass of glass and bubbles 16 may tend to make bubbles 16 less stable when there is the presence of a high moisture atmosphere downstream of melter 1 in downstream flow channel 26. A high moisture atmosphere may exist in downstream flow channel 26 for example when one or more low momentum oxy/fuel combustion burners are used to heat downstream flow channel 26, or when one or more high momentum burners (whether oxy/fuel or not) are used as impingement burners in downstream flow channel 26 to impinge on foam, or when gas lancing is used to impinge an inert or reactive, non-combustion gas on foam in downstream flow channel 26. Use of one or more low momentum burners to produce a moisture-rich atmosphere in downstream flow channel 26, and use of inert or reactive, non-combustion gas lancing into downstream flow channel 26 are both described in assignee's co-pending patent application U.S. Ser. Nos. 13/644,058 and 13/644,101, both filed Oct. 3, 2012. The use of one or more high momentum impingement burners (whether oxy/fuel or not) in a downstream flow channel is described in assignee's co-pending application U.S. Ser. No. 13/493,170, filed Jun. 11, 2012 (now U.S. Pat. No. 8,707,739).

Measuring effectiveness of the treating composition may generally be made by taking samples of the molten mass of glass and counting bubbles and there size in the molten mass, or a solidified or partially solidified sample thereof, using the naked eye. Another naked eye measurement may simply be comparing an acceptable glass to a treated glass sample, and making a naked eye comparison. More sophisticated methods and equipment may certainly be used, such as image analysis using computers to measure size, size distribution and quantity of bubbles (or other parameters) within a high resolution photograph or micrograph of the material to be analyzed. For example, companies such as Glass Service market processes and equipment for such measurements. The glass melting process, as well as phenomena within the melt, may be continuously observed, recorded and evaluated using an HTO (high temperature observation) furnace equipped with a special silica observation crucible. This equipment may be further coupled with image analysis equipment to provide easy manipulation of recorded data. In a "melt test", the objective is to evaluate the fining characteristics of differing batch compositions. The area of the recorded images occupied by inhomogeneities (bubbles), bubble size distribution, bubble number, as well as bubble growth rates vs. melting time, may be evaluated to provide comparison between individual batches. The records of the melting course may be provided in the form of video files, which may be replayed on a personal computer, handheld computer, or other viewer. Bubble growth rate measurements may be based on direct observation and recording of bubble sizes depending on time. It is possible to keep bubbles suspended in the melt for hours by the developed "shuttle" method. The temperature dependence of bubble growth rate as a function of the stationary concentration of the refining gases may be used as input data to a computer program known under the trade designation TRACE in a glass furnace model to calculate fining studies. In embodiments where it is desired to decrease stability or remove bubbles, a reduction of 5 percent, or 10 percent, or 20 percent, or 30 percent may be acceptable. In other embodiments, nothing short of complete or substantially complete bubble removal will suffice, in other words 90 percent, or 95 percent, or 99 percent, or even 99.9 percent reduction in bubbles. Similarly, in embodiments where it is desired to stabilize bubbles 16, then a measure of effectiveness may be to visually compare an acceptable sample with a treated sample, either by human or machine-aided device.

Figure 4:
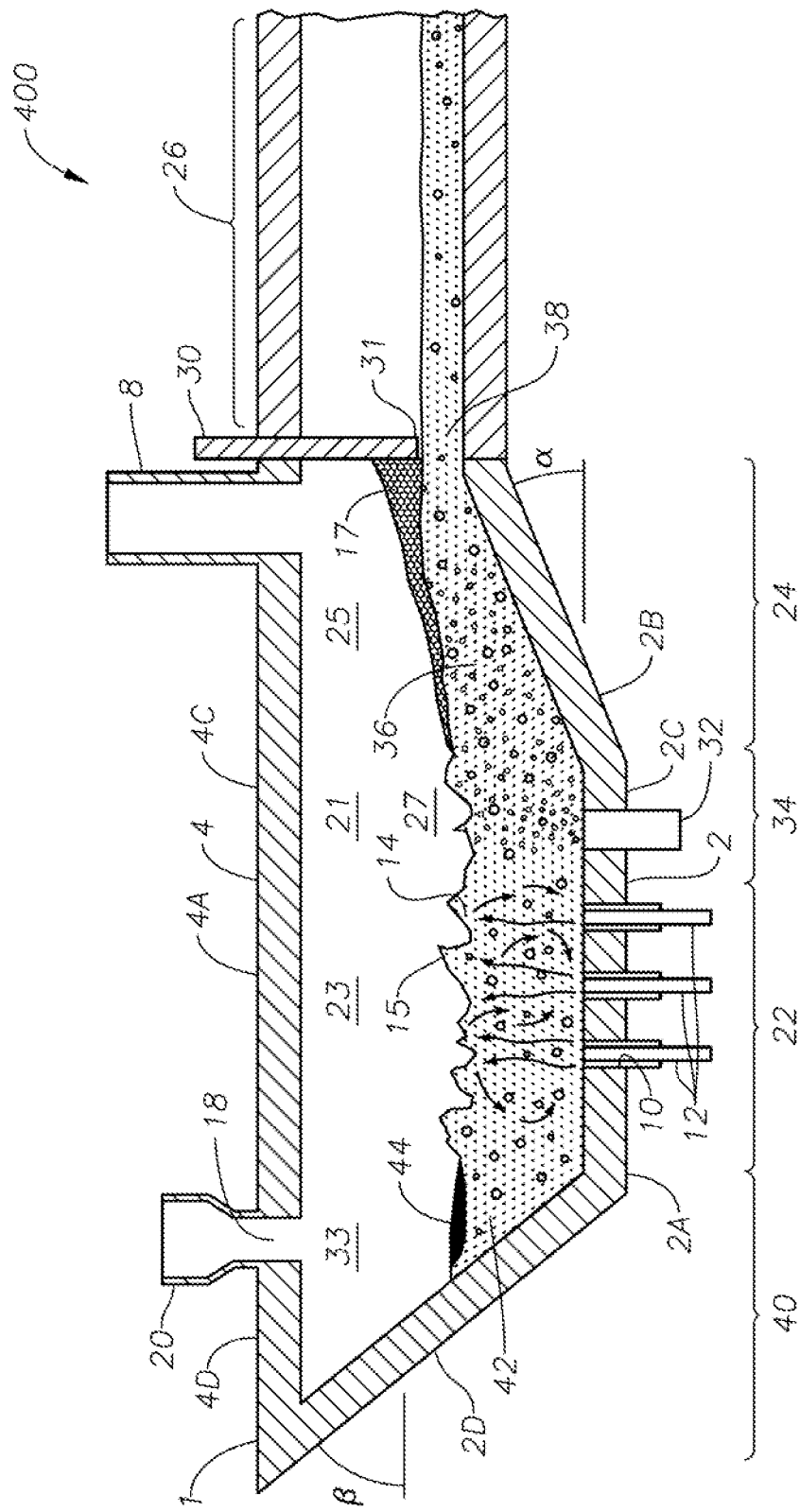

FIG. 4 illustrates schematically a side elevation view, partially in cross-section with some portions cut away, of an SCM embodiment 400 in accordance with this disclosure. Embodiment 400 expands on and differs from embodiment 300 in that embodiment 400 includes a fourth portion 33 of internal space 21, defined by a portion 2D of floor 2 and a portion 4D of roof 4. Floor portion 2D and roof portion 4D may be set at an angle "β", which may range from about 20 degrees to about 90 degrees. The configuration of SCM 400 and others of similar geometry, allows formation of a relatively calm feed zone 40 upstream of melting zone 22, whereby batch feed or other feed materials 44 may be made to float upon relatively calm molten glass 42. This configuration also has the added benefit of allowing the exhaust stack 8 to be placed further downstream, for example in the position illustrated schematically in FIG. 4. This configuration may decrease or substantially eliminate carryover of batch materials before they have a chance to melt in melting zone 22.

Figure 5:
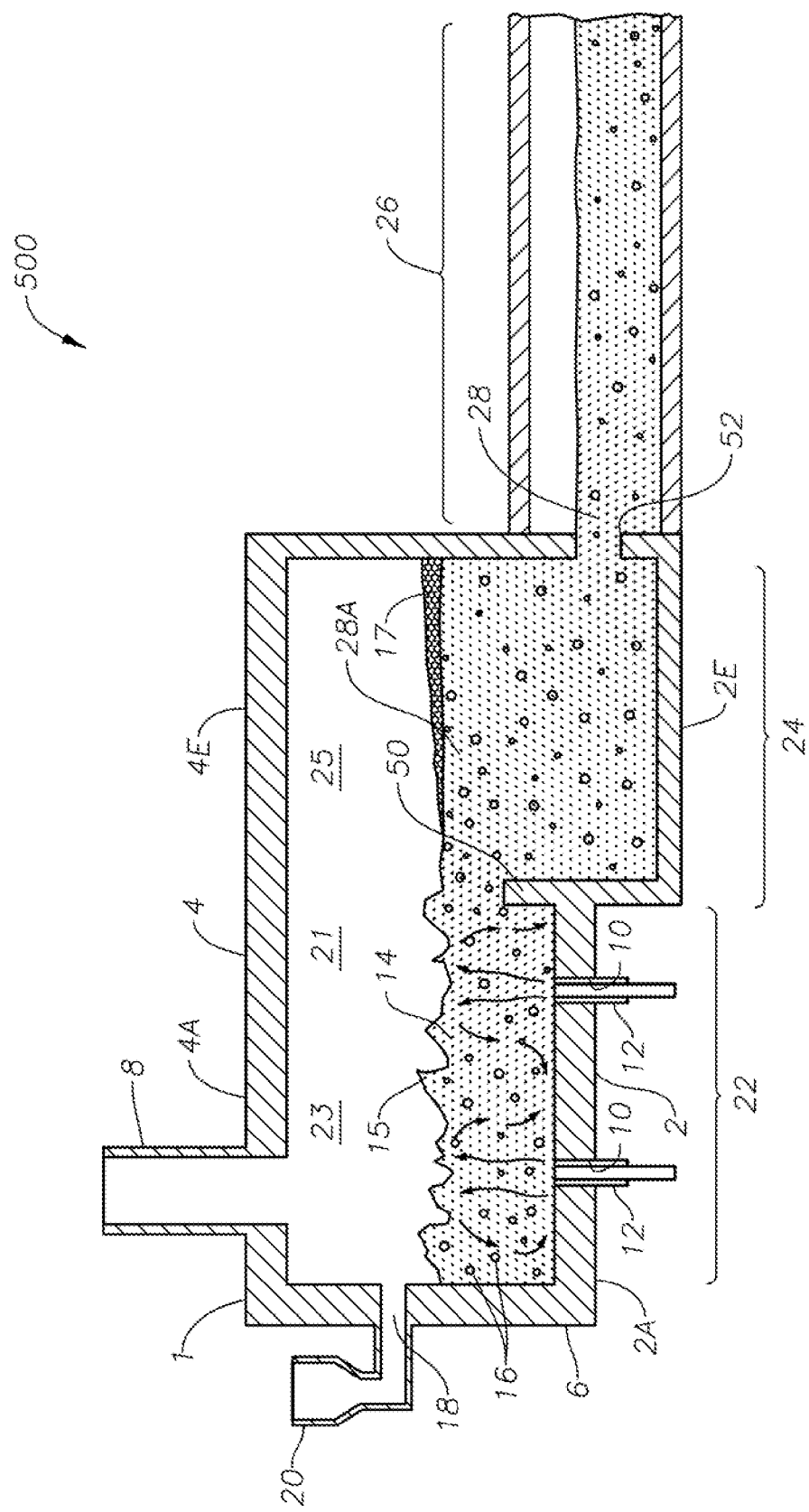

FIG. 5 illustrates schematically a side elevation view, partially in cross-section with some portions cut away, of an SCM embodiment 500 in accordance with this disclosure. Embodiment 500 may be termed a "bottom exit" or "dropped throat" SCM. In embodiment 500, melter 1 comprises an extension defined by a floor portion 2E and a roof portion 4E, an optional step 50 and an exit or throat 52 positioned substantially near floor portion 2E to allow molten glass undergoing fining 28A comprising mostly molten glass with few or no bubbles to exit the melter as fined molten glass 28. Fining zone 24 may have a length substantially equal to, less than, or greater than a length of melting zone 22, depending on the degree of fining desired. A longer fining zone 24 will generally produce better fining results, but with the disadvantage of cost of construction. However, flow channel 26 may be able to be shortened. Optionally, stack 8 may be moved to fining zone 24 as noted above in reference to embodiment 400, to decrease batch loss up stack 8. Turbulence in fining zone 24 is less than the turbulence in melting zone 22. In certain embodiments turbulence in fining zone 24 may be 10 percent less than in melting zone 22, or 20 percent less, or 30 percent less, or 40 percent less, or 50 percent less than turbulence in melting zone 22. In certain embodiment it may even be more than 50 percent less than the turbulence in melting zone 22.

Figure 6:
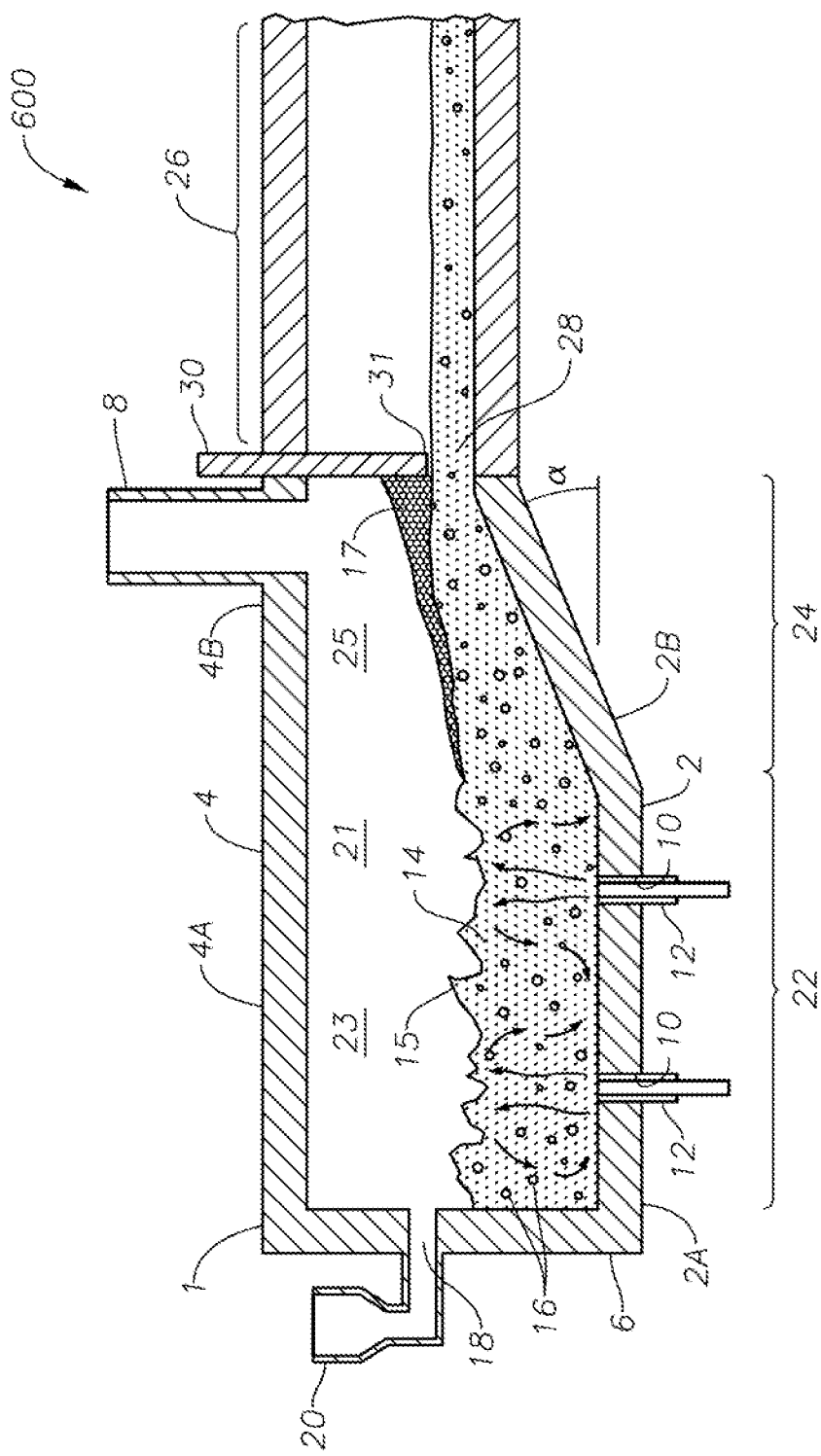

FIG. 6 illustrates schematically another SCM embodiment 600, which is similar to embodiment 100 illustrated schematically in FIG. 1, except that exhaust stack 8 is positioned over fining zone 24. In embodiment 600 as illustrated, exhaust stack 8 is positioned quite close to skimmer 30, but this is not necessarily so in all embodiments. The primary function of positioning exhaust stack 8 in fining zone 24 is to reduce the likelihood of entrainment of fine batch particles in the exhaust, effectively bypassing melting zone 23. Basically, we have found that moving the exhaust stack away from the batch feed is a positive move and doing so with a fining extension as well as a batch extension (as illustrated schematically in FIG. 5) are independently positive in their effect.

Devices capable if delivering a treatment composition may or may not be insertable and removable into the SCM. Embodiments of suitable devices are disclosed in assignee's co-pending application U.S. Ser. No. 13/633,998, filed Oct. 3, 2012 (now U.S. Pat. No. 8,973,405). The devices disclosed in that application are essentially conduits having one or more apertures for emitting a treating composition. In one embodiment the conduit includes two left-extending conduits and three right-extending conduits, each having holes or apertures for emitting composition. Other embodiments include only a single elongated slot for emitting composition, while other embodiments may include a plurality of smaller length slots. Yet other embodiments may include a serpentine conduit with a plurality of apertures or orifices for emitting composition. Still other embodiments may include two or more elongated slots positioned on opposite sides of the main conduit. Each of these embodiments, and others, may have advantages in certain situations.

Figure 7:
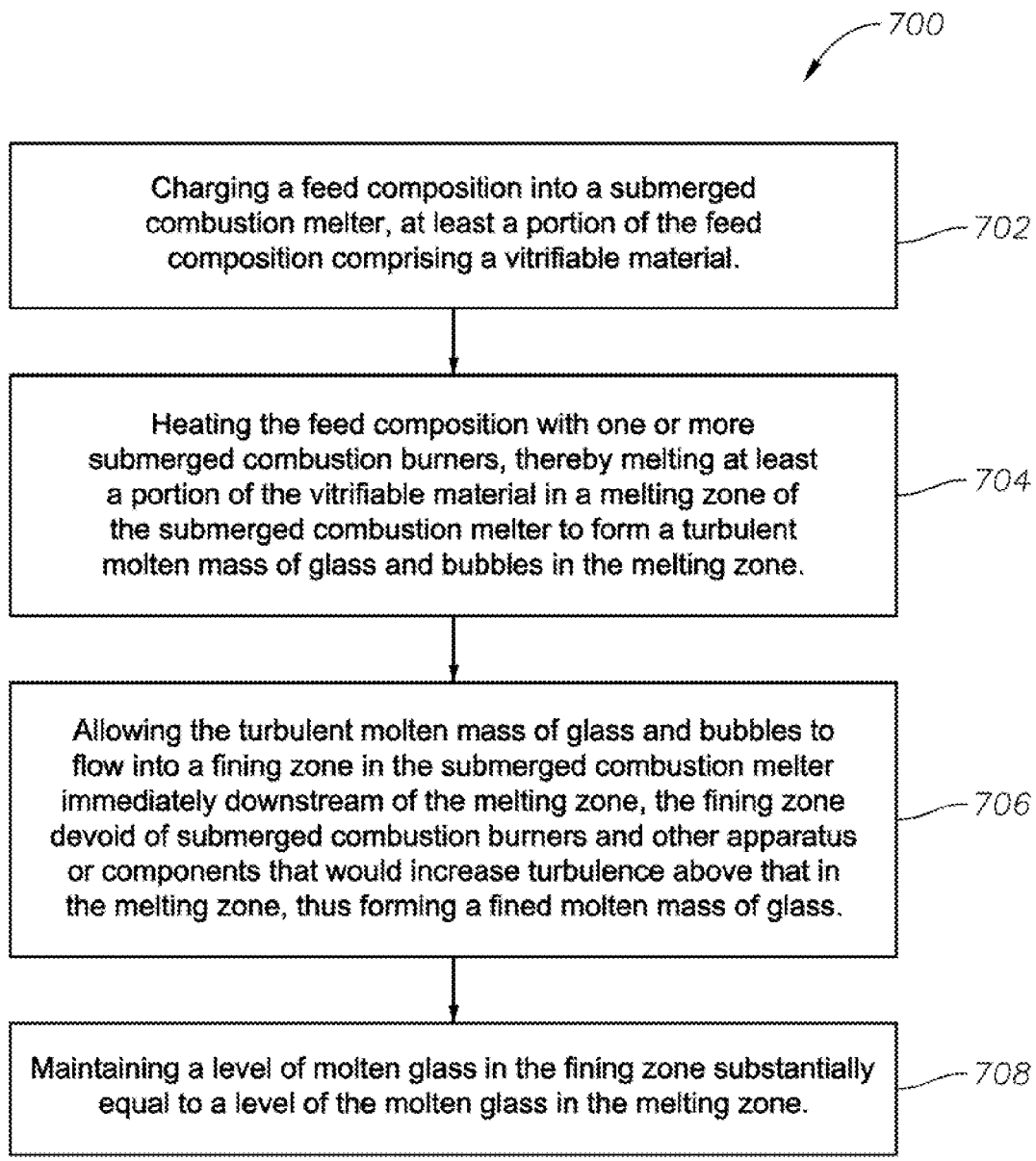
FIGS. 7 and 8 are logic diagrams of two process embodiments of the present disclosure.
Figure 8:
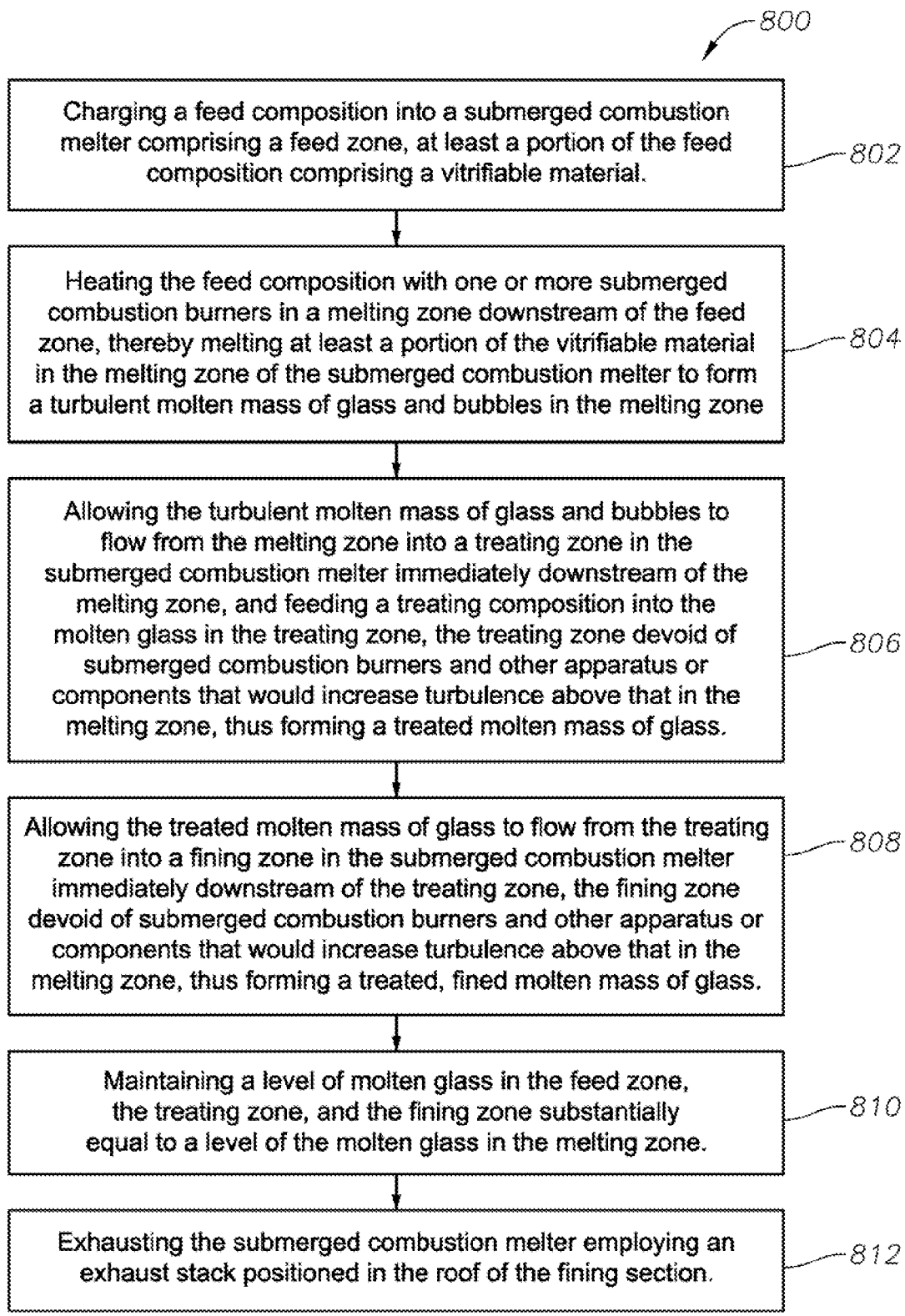

FIGS. 7 and 8 are logic diagrams of two process embodiments 700 and 800 of the present disclosure. Process embodiment 700 includes charging a feed composition into a submerged combustion melter comprising a geometry, at least a portion of the feed composition comprising a vitrifiable material (box 702). The process further comprises heating the feed composition with one or more submerged combustion burners, thereby melting at least a portion of the vitrifiable material in a melting zone of the submerged combustion melter to form a turbulent molten mass of glass and bubbles in the melting zone, box 704. The process further includes allowing the turbulent molten mass of glass and bubbles to flow into a fining zone in the submerged combustion melter immediately downstream of the melting zone, the fining zone devoid of submerged combustion burners and other apparatus or components that would increase turbulence above that in the melting zone, thus forming a fined molten mass of glass, box 706. The process further includes maintaining a level of molten glass in the fining zone substantially equal to a level of the molten glass in the melting zone, box 708.

Process embodiment 800 includes charging a feed composition into a submerged combustion melter comprising a feed zone, at least a portion of the feed composition comprising a vitrifiable material (box 802). The process further comprises heating the feed composition with one or more submerged combustion burners in a melting zone downstream of the feed zone, thereby melting at least a portion of the vitrifiable material in the melting zone of the submerged combustion melter to form a turbulent molten mass of glass and bubbles in the melting zone, box 804. The process further includes allowing the turbulent molten mass of glass and bubbles to flow from the melting zone into a treating zone in the submerged combustion melter immediately downstream of the melting zone, and feeding a treating composition into the molten glass in the treating zone, the treating zone devoid of submerged combustion burners and other apparatus or components that would increase turbulence above that in the melting zone, thus forming a treated molten mass of glass (box 806). Process embodiment 800 further comprises allowing the treated molten mass of glass to flow from the treating zone into a fining zone in the submerged combustion melter immediately downstream of the treating zone, the fining zone devoid of submerged combustion burners and other apparatus or components that would increase turbulence above that in the melting zone, thus forming a treated, fined molten mass of glass (box 808). The process further includes maintaining a level of molten glass in the feed zone, the treating zone, and the fining zone substantially equal to a level of the molten glass in the melting zone, box 810. The process further includes exhausting the submerged combustion melter employing an exhaust stack positioned in the roof of the fining section, box 812.

Flow channel 26 may include one or more bushings (not illustrated) for example when producing glass fiber (not illustrated). Flow channels useful for use in conjunction with SCMs and processes of the present disclosure may comprise a roof, floor and sidewall structure comprised of an outer metal shell, non-glass-contact brick or other refractory wall, and glass-contact refractory for those portions expected to be in contact with molten glass. Flow channels may include several sections arranged in series, each section having a roof, floor, and sidewall structure connecting its roof and floor, and defining a flow channel for conditioning molten glass flowing there through. The sections may be divided by a series of skimmers, each extending generally substantially vertically downward a portion of a distance between the roof and floor of the channel, with a final skimmer positioned between a last channel section and a forehearth. The number of sections and the number of skimmers may each be more or less than two. The flow channel may be rectangular as illustrated in the various figures, or may be a shape such as a generally U-shaped or V-shaped channel or trough of refractory material supported by a metallic superstructure.

The flow rate of the fined molten glass, or the treated, fined molten glass will depend on many factors, including the geometry and size of the SCM, skimmer depth into the molten glass, temperature of the melt, viscosity of the melts, and like parameters, but in general the flow rate of molten glass may range from about 0.5 lb./min to about 5000 lbs./min or more (about 0.23 kg/min to about 2300 kg/min or more), or from about 10 lbs./min to about 500 lbs./min (from about 4.5 kg/min to about 227 kg/min), or from about 100 lbs./min to 300 lbs./min (from about 45 kg/min to about 136 kg/min).

In embodiments where foam is not desired, the SCM and/or flow channel(s) may include one or more high momentum combustion burners (such as in the above-mentioned patent application U.S. Ser. No. 13/268,130, filed Oct. 7, 2011) positioned above the melt in the roof to burst at least some foam retained behind a skimmer, or remaining floating on top of a molten mass of glass flowing in the SCM or flow channel. High momentum burners may act to heat and/or directly impinge on bubbles. Flow channels may also include one or more low momentum combustion burners in the roof of each section to transfer heat to the molten mass of glass without substantial interference from the foamed material. As noted elsewhere herein, low momentum burners, also referred to as non-impingement burners, may alternately or in addition be positioned in section sidewall structures, or both in section roofs and section sidewall structures.

High momentum burners useful in apparatus, systems, and methods of this disclosure include those disclosed assignee's patent application U.S. Ser. No. 13/268,130, filed Oct. 7, 2011, which include an oxidant conduit and an inner concentric fuel conduit. Oxidant and fuel supplies for these burners may quick connect/disconnect features, allowing a hose of other source of fuel to be quickly attached to and detached from the conduits. For example, high momentum burner embodiments may comprise a nominal ¼-inch stainless steel Schedule 40 pipe for the fuel conduit and a nominal ¾-inch stainless steel Schedule 40 pipe for the oxidant conduit. Nominal ¼-inch Schedule 40 pipe has an external diameter of 0.54 inch (1.37 cm) and an internal diameter of 0.36 inch (0.91 cm), while nominal ¾-inch Schedule 40 pipe has an external diameter of 1.05 inch (2.67 cm) and internal diameter of 0.82 inch (2.08 cm). The selection of conduit schedule dictates the annular distance between the OD of the inner fuel conduit and the internal diameter (ID) of the oxidant conduit. These dimensions are merely examples, as any arrangement that produces the desired momentum and/or heat will be suitable, and within the skills of the skilled artisan in possession of this disclosure. High momentum burners may be fluid-cooled by employing a third concentric conduit creating an annular region between the oxidant conduit and third conduit.

For high momentum burners burning natural gas, the burners may have a fuel firing rate ranging from about 10 to about 1000 scfh (from about 280 L/hr. to about 28,000 L/hr.); an oxygen firing rate ranging from about 15 to about 2500 scfh (from about 420 L/hr. to about 71,000 L/hr.); a combustion ratio ranging from about 1.5 to about 2.5; nozzle velocity ratio (ratio of velocity of fuel to oxygen at the fuel nozzle tip) ranging from about 0.5 to about 2.5; fuel gas velocity ranging from about 150 to about 1000 ft./sec (from about 46 m/sec to about 300 m/sec); and oxygen velocity ranging from about 150 to about 1000 ft./sec (from about 46 m/sec to about 300 m/sec). Of course these numbers depend on the heating value of the fuel, amount of oxygen in the "oxygen" stream, temperatures and pressures of the fuel and oxidant, and the like, among other parameters. In one typical operation, the high momentum burner would have a combustion ratio of 2.05:1; a velocity ratio of 1; firing rate of natural gas of 500 scfh (14,000 L.hr.) and 1075 scfh (30,400 L/hr.) oxygen; natural gas and oxygen velocities each of 270 ft./sec (80 m/sec); natural gas pressure of 1 psig (6.9 KPa); and oxygen pressure of 0.6 psig (4.1 KPa), pressures measured at the entrance to the combustion chamber.

Low momentum burners useful in apparatus, systems, and methods of this disclosure may include some of the features of those disclosed in assignee's patent application U.S. Ser. No. 13/268,130, filed Oct. 7, 2011 (now U.S. Pat. No. 9,021,838). For low momentum burners using natural gas as fuel, the burners may have a fuel firing rate ranging from about 0.4 to about 40 scfh (from about 11 L/hr. to about 1,120 L/hr.); an oxygen firing rate ranging from about 0.6 to about 100 scfh (from about 17 L/hr. to about 2,840 L/hr.); a combustion ratio ranging from about 1.5 to about 2.5; nozzle velocity ratio (ratio of velocity of fuel to oxygen at the fuel nozzle tip) ranging from about 0.5 to about 2.5; a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

Submerged combustion burners useful in the SC melter apparatus described herein include those described in U.S. Pat. Nos. 4,539,034; 3,170,781; 3,237,929; 3,260,587; 3,606,825; 3,627,504; 3,738,792; 3,764,287; and 7,273,583, and assignee's co-pending patent application U.S. Ser. No. 13/268,028, filed Oct. 7, 2011 (now U.S. Pat. No. 8,875,544). The total quantities of fuel and oxidant used by the SC burners in systems of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2, In certain embodiments, the equivalent fuel content of the feed material must be taken into account. For example, organic binders in glass fiber mat scrap materials will increase the oxidant requirement above that required strictly for fuel being combusted. In consideration of these embodiments, the combustion ratio may be increased above 1.2, for example to 1.5, or to 2, or 2.5, or even higher, depending on the organic content of the feed materials.

The velocity of the fuel gas in the various SC burners depends on the burner geometry used, but generally is at least about 15 m/s. The upper limit of fuel velocity depends primarily on the desired mixing of the melt in the melter apparatus, melter geometry, and the geometry of the burner; if the fuel velocity is too low, the flame temperature may be too low, providing inadequate melting, which is not desired, and if the fuel flow is too high, flame might impinge on the melter floor, roof or wall, and/or heat will be wasted, which is also not desired.

In certain embodiments the SC burners may be floor-mounted burners. In certain embodiments, the SC burners may be positioned in rows substantially perpendicular to the longitudinal axis (in the melt flow direction) of melter 10. In certain embodiments, the SC burners may be positioned to emit combustion products into molten glass in a melting zone in a fashion so that the gases penetrate the melt generally perpendicularly to the floor. In other embodiments, one or more burners may emit combustion products into the melt at an angle to the floor of the melter, as taught in assignee's pending U.S. Ser. No. 12/817,754, filed Jun. 17, 2010 (now U.S. Pat. No. 8,769,992).

Those of skill in this art will readily understand the need for, and be able to construct suitable fuel supply conduits and oxidant supply conduits, as well as respective flow control valves, threaded fittings, quick connect/disconnect fittings, hose fittings, and the like.

High momentum burners and low momentum burners may be mounted to the sidewall structure and/or roof of the flow channel sections using adjustable mounts, such as a ceramic-lined ball turrets, as explained in the afore-mentioned Ser. No. 13/268,130 application (now U.S. Pat. No.9,021,838).

Aside from the features newly described herein, SCMs described herein may be any of the currently known submerged combustion melter designs, or may be one of those described in assignee's currently pending patent application U.S. Ser. No. 12/817,754, filed Jun. 17, 2010 (now U.S. Pat. No. 8,769,992). SCMs may take any number of forms, including those described in assignee's co-pending application U.S. Ser. No. 12/817,754, which describes sidewalls forming an expanding melting zone formed by a first trapezoidal region, and a narrowing melting zone formed by a second trapezoidal region, wherein a common base between the trapezoid defines the location of the maximum width of the melter. Optionally, fluid-cooled panels may comprise some or all of the sidewall structure.

Submerged combustion melters may be fed a variety of feed materials by one or more roll stands, which in turn supports one or more rolls of glass mat, as described in assignee's co-pending application U.S. Ser. No. 12/888,970, filed Sept. 23, 2010 (now U.S. Pat. No. 8,650,914), incorporated herein by reference. In certain embodiments powered nip rolls may include cutting knives or other cutting components to cut or chop the mat (or roving, in those embodiments processing roving) into smaller length pieces prior to entering melter 602. Also provided in certain embodiments may be a glass batch feeder. Glass batch feeders are well-known in this art and require no further explanation.

The initial raw material may include any material suitable for forming molten glass such as, for example, limestone, glass, sand, soda ash, feldspar and mixtures thereof. A glass composition for producing glass fibers known as "E-glass" typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in assignee's published U.S. applications 2007/0220922 and 2008/0276652. The initial raw material to provide these glass compositions can be calculated in known manner from the desired concentrations of glass components, molar masses of glass components, chemical formulas of batch components, and the molar masses of the batch components. Typical E-glass batches include those reproduced in Table 1, borrowed from the 2007/0220922 published application. Notice that during glass melting, carbon dioxide (from lime) and water (borax) evaporate. The initial raw material can be provided in any form such as, for example, relatively small particles.

TABLE 1

A typical E-glass batch
BATCH COMPOSITION (BY WEIGHT)

| Raw material | Limestone (Baseline) | Quick-lime | Ca Silicate | Volcanic Glass | Ca Silicate & Volcanic Glass | Quartz-free #1 | Quartz-free #2 | Limestone Slag | Ca Silicate Slag | Quartz-free #3 | Quartz and Clay Free | Ca Silicate/Feldspar |
|---|---|---|---|---|---|---|---|---|---|---|---|---|
| Quartz (flint) | 31.3% | 35.9% | 15.2% | 22.6% | 8.5% | 0% | 0% | 22.3% | 5.7% | 0% | 0% | 19.9% |
| Kaolin Clay | 28.1% | 32.3% | 32.0% | 23.0% | 28.2% | 26.4% | 0% | 22.7% | 26.0% | 26.0% | 0% | 0% |
| BD Lime | 3.4% | 4.3% | 3.9% | 3.3% | 3.8% | 3.7% | 4.3% | 2.8% | 3.1% | 3.1% | 4.3% | 4.4% |
| Borax | 4.7% | 5.2% | 5.2% | 0% | 1.5% | 0% | 0% | 0% | 0% | 0% | 1.1% | 1.1% |
| Boric Acid | 3.2% | 3.9% | 3.6% | 7.3% | 6.9% | 8.2% | 8.6% | 7.3% | 8.2% | 8.2% | 7.7% | 7.8% |
| Salt Cake | 0.2% | 0.2% | 0.2% | 0.2% | 0.2% | 0.2% | 0.2% | 0.2% | 0.2% | 0.2% | 0.2% | 0.2% |
| Limestone | 29.1% | 0% | 0% | 28.7% | 0% | 0% | 0% | 27.9% | 0% | 0% | 0% | 0% |
| Quicklime | 0% | 18.3% | 0% | 0% | 0% | 0% | 0% | 0% | 0% | 0% | 0% | 0% |
| Calcium Silicate | 0% | 0% | 39.9% | 0% | 39.1% | 39.0% | 27.6% | 0% | 37.9% | 37.9% | 26.5% | 26.6% |
| Volcanic Glass | 0% | 0% | 0% | 14.9% | 11.8% | 17.0% | 4.2% | 14.7% | 16.8% | 16.8% | 0% | 0% |
| Diatomaceous Earth (DE) | | | | | | 5.5% | 17.4% | 0% | 0% | 5.7% | 20.0% | 0% |
| Plagioclase Feldspar | | | | | | 0% | 38.3% | 0% | 0% | 0% | 40.1% | 40.1% |
| Slag | | | | | | 0% | 0% | 2.0% | 2.0% | 2.0% | 0% | 0% |
| Total | 100% | 100% | 100% | 100% | 100% | 100% | 100% | 100% | 100% | 100% | 100% | 100% |
| Volume of CO2@ 1400 C. | 1668 | 0 | 0 | 1647 | 0 | 0 | 0 | 1624 | 0 | 0 | 0 | 0 |

SCMs in accordance with the present disclosure may also comprise one or more wall-mounted submerged combustion burners, and/or one or more roof-mounted burners. Roof-mounted burners may be useful to pre-heat the melting zone, and serve as ignition sources for one or more submerged combustion burners. Melters having only wall-mounted, submerged-combustion burners are also considered within the present disclosure. Roof-mounted burners may be oxy-fuel burners, but as they are typically only used in certain situations, are more likely to be air/fuel burners. Most often they would be shut-off after pre-heating the melter and/or after starting one or more submerged combustion burners. In certain embodiments, if there is a possibility of carryover of particles to the exhaust, one or more roof-mounted burners could be used to form a curtain to prevent particulate carryover. In certain embodiments, one or more submerged combustion burners may be oxy/fuel burners (where "oxy" means oxygen, or oxygen-enriched air, as described earlier), but this is not necessarily so in all embodiments; some or all of the submerged combustion burners may be air/fuel burners. Furthermore, heating may be supplemented by electrical heating in certain melter embodiments, in melting zones, feed zones, treating zones, and/or fining zones. In certain embodiments the oxy-fuel burners may comprise one or more submerged combustion burners each having co-axial fuel and oxidant tubes forming an annular space there between, wherein the outer tube extends beyond the end of the inner tube, as taught in U.S. Pat. No. 7,273,583. Burners may be flush-mounted with the melter floor in certain embodiments. In other embodiments, such as disclosed in the '583 patent, a portion of one or more of the burners may extend slightly into the melt above the melter floor.

In certain embodiments, melter sidewalls may have a free-flowing form, devoid of angles. In certain other embodiments, sidewalls may be configured so that an intermediate location may comprise an intermediate region of melters having constant width, extending from a first trapezoidal region to the beginning of a narrowing melting region. Other embodiments of suitable melters are described in the above-mentioned '754 application.

As mentioned herein, SCMs may include refractory fluid-cooled panels. Liquid-cooled panels may be used, having one or more conduits or tubing therein, supplied with liquid through one conduit, with another conduit discharging warmed liquid, routing heat transferred from inside the melter to the liquid away from the melter. Liquid-cooled panels may also include a thin refractory liner, which minimizes heat losses from the melter, but allows formation of a thin frozen glass shell to form on the surfaces and prevent any refractory wear and associated glass contamination. Other useful cooled panels include air-cooled panels, comprising a conduit that has a first, small diameter section, and a large diameter section. Warmed air transverses the conduits such that the conduit having the larger diameter accommodates expansion of the air as it is warmed. Air-cooled panels are described more fully in U.S. Pat. No. 6,244,197. In certain embodiments, the refractory fluid cooled-panels are cooled by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids that may be organic, inorganic, or some combination thereof, for example, salt solutions, glycol solutions, oils and the like. Other possible heat transfer fluids include steam (if cooler than the oxygen manifold temperature), carbon dioxide, or mixtures thereof with nitrogen. Heat transfer fluids may be compositions comprising both gas and liquid phases, such as the higher chlorofluorocarbons.

Certain embodiments may comprise a process control scheme for the submerged combustion melter and burners. For example, as explained in the '914 patent, a master process controller may be configured to provide any number of control logics, including feedback control, feed-forward control, cascade control, and the like. The disclosure is not limited to a single master process controller, as any combination of controllers could be used. The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner control elements and glass mat feeding devices able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules. The controller may utilize Model Predictive Control (MPC) or other advanced multivariable control methods used in multiple input/multiple output (MIMO) systems. As mentioned previously, the methods of assignee's co-pending application U.S. Ser. No. 13/268,065, filed Oct. 7, 2011 (now U.S. Pat. No. 8,973,400), using the vibrations and oscillations of the melter itself, may prove useful predictive control inputs.

Both the melter and flow channel floors and sidewall structures may include a glass-contact refractory lining, as discussed herein. The glass-contact lining may be 1 centimeter, 2 centimeters, 3 centimeters or more in thickness, however, greater thickness may entail more expense without resultant greater benefit. The refractory lining may be one or multiple layers. Glass-contact refractory used in melters and channels described herein may be cast concretes such as disclosed in U.S. Pat. No. 4,323,718. Two cast concrete layers are described in the '718 patent, the first being a hydraulically setting insulating composition (for example, that known under the trade designation CASTABLE BLOC-MIX-G, a product of Fleischmann Company, Frankfurt/Main, Federal Republic of Germany). This composition may be poured in a form of a wall section of desired thickness, for example a layer 5 cm thick, or 10 cm, or greater. This material is allowed to set, followed by a second layer of a hydraulically setting refractory casting composition (such as that known under the trade designation RAPID BLOCK RG 158, a product of Fleischmann company, Frankfurt/Main, Federal Republic of Germany) may be applied thereonto. Other suitable materials for the refractory cooled panels, melter and channel refractory liners, and refractory block burners (if used) are fused zirconia ($ZrO_2$), fused cast AZS (alumina-zirconia-silica), rebonded AZS, or fused cast alumina ($Al_2O_3$). The choice of a particular material is dictated among other parameters by the melter geometry and type of glass to be produced. The refractory or refractory-lined channels or troughs described in accordance with the present disclosure may be constructed using refractory cooled panels.

Those having ordinary skill in this art will appreciate that there are many possible variations of the melter, flow channels, burners, and adjustment mechanisms to adjust composition emission into the molten glass and foaming, and will be able to devise alternatives and improvements to those described herein that are nevertheless considered to be within the claims.

What is claimed is:

1. A submerged combustion melter comprising:
   a floor, a roof, and a sidewall structure connecting the floor and roof defining an internal space, a first portion of the internal space comprising a melting zone, and a second portion of the internal space defining a fining zone immediately downstream of the melting zone, the floor in the melting zone being horizontal and the floor in the fining zone angled upward relative to horizontal beginning at an entrance to the fining zone and extending to an exit of the fining zone, the floor in the fining zone rises uniformly from a depth of the horizontal floor in the melting zone to a final depth that is at least 10 percent less than a depth of the melting zone;
   one or more combustion burners in either the floor, the roof, the sidewall structure, or any two or more of these, producing combustion gases and configured to emit the combustion gases from a position under a level of, and positioned to transfer heat to and produce, a turbulent molten mass of glass containing bubbles in the melting zone;
   the submerged combustion melter comprising a geometry whereby the level of the molten glass is substantially equivalent in the melting zone and the fining zone, and the fining zone is devoid of combustion burners or other apparatus or components that would increase turbulence above that in the melting zone.

2. The submerged combustion melter of claim 1 wherein at least some of the floor, the roof, and the sidewall structure comprise fluid-cooled panels.

3. The submerged combustion melter of claim 1 comprising a flow channel fluidly and mechanically connected to the melter downstream of the fining zone.

4. The submerged combustion melter of claim 1 wherein the melting zone is defined by first portions of the floor, roof, and sidewall structure forming a melting section, and the fining zone is defined by second portions of the floor, roof, and sidewall structure forming a melter extension fluidly and mechanically connected to the melting section.

5. The submerged combustion melter of claim 1 comprising a feed zone upstream of the melting zone, the feed zone devoid of submerged combustion burners.

6. The submerged combustion melter of claim 5 comprising an exhaust stack positioned in the roof of the fining section.

7. The submerged combustion melter of claim 1 comprising an exhaust stack positioned in the roof of the fining section.

8. A submerged combustion melter comprising:
   a floor, a roof, and a sidewall structure connecting the floor and roof defining an internal space, a first portion of the internal space comprising a melting zone, and a second portion of the internal space defining a fining zone immediately downstream of the melting zone, the floor in the melting zone being horizontal and the floor in the fining zone angled upward relative to horizontal beginning at an entrance to the fining zone and extending to an exit of the fining zone, the floor in the fining zone rises uniformly from a depth of the horizontal floor in the melting zone to a final depth that is at least 10 percent less than a depth of the melting zone;
   a skimmer extending from the roof having distal end, the skimmer configured so that the distal end extends into the molten glass a depth sufficient to hold back a portion of the molten glass flowing out of the submerged combustion melter through an exit that is lower than the distal end of the skimmer;

one or more combustion burners in either the floor, the roof, the sidewall structure, or any two or more of these, producing combustion gases and configured to emit the combustion gases from a position under a level of, and positioned to transfer heat to and produce, a turbulent molten mass of glass containing bubbles in the melting zone;

the submerged combustion melter comprising a geometry whereby the level of the molten glass is substantially equivalent in the melting zone and the fining zone, and the fining zone is devoid of combustion burners or other apparatus or components that would increase turbulence above that in the melting zone.

9. The submerged combustion melter of claim 8 wherein at least some of the floor, the roof, and the sidewall structure comprise fluid-cooled panels.

10. The submerged combustion melter of claim 8 comprising a flow channel fluidly and mechanically connected to the melter downstream of the fining zone.

11. The submerged combustion melter of claim 8 wherein the melting zone is defined by first portions of the floor, roof, and sidewall structure forming a melting section, and the fining zone is defined by second portions of the floor, roof, and sidewall structure forming a melter extension fluidly and mechanically connected to the melting section.

12. The submerged combustion melter of claim 8 comprising a feed zone upstream of the melting zone, the feed zone devoid of submerged combustion burners.

13. The submerged combustion melter of claim 12 comprising an exhaust stack positioned in the roof of the fining section.

14. The submerged combustion melter of claim 8 comprising an exhaust stack positioned in the roof of the fining section.

* * * * *